(12) United States Patent
Dixon (10) Patent No.: US 10,651,766 B2
(45) Date of Patent: May 12, 2020

(54) MOTOR CONTROL (71) Applicant: TRW Limited, Solihull West Midlands (GB)

(72) Inventor: Christopher David Dixon, West Midlands (GB)

(73) Assignee: TRW Limited, Solihull, West Midlands (*) Notice: Subject to any disclaimer, the term of this patent is extended or adjusted under 35 U.S.C. 154(b) by 0 days.

(21) Appl. No.: 14/773,051

(22) PCT Filed: Mar. 5, 2014

(86) PCT No.: PCT/GB2014/050645
§ 371 (c)(1),
(2) Date: Sep. 4, 2015

(87) PCT Pub. No.: WO2014/135867
PCT Pub. Date: Sep. 12, 2014

(65) Prior Publication Data
US 2016/0028335 A1  Jan. 28, 2016

(30) Foreign Application Priority Data

Mar. 7, 2013  (GB) .................................. 1304159.5

(51) Int. Cl.
*H02P 6/10* (2006.01)
*H02P 23/03* (2006.01)
*B62D 5/04* (2006.01)

(52) U.S. Cl.
CPC ................ *H02P 6/10* (2013.01); *B62D 5/046* (2013.01); *B62D 5/0463* (2013.01); *B62D 5/0487* (2013.01); *H02P 23/03* (2013.01)

(58) Field of Classification Search
CPC .. H02P 6/10; H02P 25/098; H02P 6/04; H02P 8/14; H02P 21/30; H02P 25/089; H02P 2205/05
See application file for complete search history.

(56) References Cited

U.S. PATENT DOCUMENTS 5,796,221 A * 8/1998 Cramer .................. B65G 43/02
318/46
6,874,595 B2 * 4/2005 Mukai .................. B62D 5/0463
180/446

(Continued)

FOREIGN PATENT DOCUMENTS

EP   1616774 A2   1/2006
EP   1914878 A2   4/2008

(Continued)

OTHER PUBLICATIONS

Patents Act 1977: Search Report under Section 17(5), Application No. GB 1304159.5, dated Oct. 1, 2013.

(Continued)

*Primary Examiner* — Bickey Dhakal
(74) *Attorney, Agent, or Firm* — MacMillian, Sobanski & Todd, LLC (57) ABSTRACT

A motor control circuit for an electric motor of an electric power assisted steering system of the kind in which a measurement of torque carried by a part of the steering system is used to produce a torque demand signal indicative of a torque to be applied to the steering system by the motor. The motor control circuit includes a current controller is responsive to an error signal that represents the difference between a current demand signal and an actual current signal, and a noise reduction circuit adapted to identify an operating condition of the system in which the motor is stationary or rotating at a very low speed, and in the event that the operating condition is identified the noise reduction circuit is adapted to reduce the response of the controller to variations in the error signal.

6 Claims, 6 Drawing Sheets (56) References Cited

U.S. PATENT DOCUMENTS

| | | | |
|---|---|---|---|
| 2005/0065685 A1* | 3/2005 | Hamamoto | B62D 5/0466 |
| | | | 701/41 |
| 2006/0012323 A1 | 1/2006 | Endo et al. | |
| 2008/0154462 A1* | 6/2008 | Yamamoto | B62D 5/0469 |
| | | | 701/41 |
| 2012/0068643 A1* | 3/2012 | Suzuki | H02P 27/085 |
| | | | 318/400.13 |

FOREIGN PATENT DOCUMENTS

| | | |
|---|---|---|
| EP | 1935753 A1 | 6/2008 |
| JP | 2007137272 A | 6/2007 |

OTHER PUBLICATIONS

PCT Search Report and Written Opinion, Application No. PCT/GB2014/050645, dated Sep. 11, 2014.

* cited by examiner

MOTOR CONTROL

CROSS-REFERENCE TO RELATED APPLICATIONS

This application is a national stage of International Application No. PCT/GB2014/050645 filed Mar. 5, 2014, the disclosures of which are incorporated herein by reference in entirety, and which claimed priority to Great Britain Patent Application No. 1304159.5 filed Mar. 7, 2013, the disclosures of which are incorporated herein by reference in entirety.

BACKGROUND OF THE INVENTION

This invention relates to improvements in motor control circuits for use in electric power assisted steering systems, and in particular to pulse width modulation (PWM) control of multiple phase brushless motors in electric power assisted steering systems.

Control systems for PWM controlled electric motors, especially DC motors, generally need to measure the current through the windings or phases of the motor and this can either be done by means of separate current sensors for each of the phases, or by means of a single current sensor that is placed in the circuit so as to measure the total instantaneous current flowing between a D.C. power supply and the bridge circuit and motor combination. In a single current sensor system, the multiple motor phase currents are derived by offsetting the PWM patterns of the switches which apply the required voltage to each phase, and sampling the current sensor at appropriate points.

The measured currents are typically converted into the stationary d-q frame and then combined with a current demand signal, also in the d-q frame, indicative of the current that is demanded from the motor, to produce an error signal. The demand current in an electric power assisted steering system is generated as a function of the torque demanded from the motor. The torque demand signal is a principally a measure of the amount of torque the motor should apply to the steering to help the driver to turn the wheel.

The error signal represents the difference between the current that is demanded and the actual measured current. The error signal is fed to a controller which produces a set of voltage demand signals, also typically in the d-q frame, representative of the voltage to be applied to the motor that will best drive the error signal towards zero. The d-q voltages are then converted into PWM signals for the motor phases depending on which PWM strategy is used. The controller therefore acts to vary the PWM phase voltages in order to try to constantly minimise the magnitude of the error signal thereby ensuring that the motor current is as close as possible to the demanded current.

In a practical system the current controller will comprise a PI or PID or other type of feedback controller. The role of the current control is to modify the voltages applied to the motor with an aim of keeping the error signal value as small as possible. The controller forms a closed loop. Around the current controller the torque demand signal is produced by the torque controller, which forms another closed loop with a measurement or estimate of the torque in the steering as one input.

Motor drive circuits using feedback control and PWM are well known in the art. For example, WO2006005927, discloses a typical system and the teaching of that document is incorporated herein by reference.

BRIEF SUMMARY OF THE INVENTION

According to a first aspect the invention provides a motor control circuit for an electric motor of an electric power assisted steering system of the kind in which a measurement of torque carried by a part of the steering system is used to produce a torque demand signal indicative of a torque to be applied to the steering system by the motor, the drive circuit comprising:

a switching circuit comprising a plurality of electrical switches, a motor current controller that generates voltage demand signals to be passed to a drive circuit for the switches that in turn generates pulse width modulated switching signals for the switching circuit that cause the switches to selectively connect the phases to a power supply so as to cause current to flow through the phases of the motor, in which the current controller is responsive to an error signal that represents the difference between a current demand signal and an actual current signal, and a noise reduction circuit adapted to identify an operating condition of the system in which the motor is stationary or rotating at a very low speed, and in the event that the operating condition is identified the noise reduction circuit is adapted to reduce the response of the controller to variations in the error signal.

By reducing the response of the controller to variations in the error signal, such as high frequency variations caused by quantisation errors in the output from a current sensor, the noise reduction circuit may make the controller insensitive to changes in the error signal or reduce the magnitude of any change in the output of the controller in response to a corresponding change in the error signal. In each case, the gain of the controller is effectively reduced when the operating condition in which the motor is stationary or rotating at very low speed.

The applicant has appreciated that significant noise can be present at high frequencies in the actual current signal, typically output from a current sensor. This may be due to quantisation of the current signal where the sensor can only adopt a discrete number of output states, the value changing at a rate which depends on how often the sensor output is updated, or at the frequency of any noise in the sensor itself. If the actual current is somewhere between quantisation states it can oscillate rapidly between the states as the current signal is produced. This noise will be passed onto the error signal, and if left unchecked will cause the current controller to react because it cannot discriminate between noise and genuine changes in error that should be tracked. This noise can cause unwanted acoustic noise, especially when the motor is stationary—when it is rotating the quantization noise is disguised as the motor current will be sinusoidally varying.

The noise reduction circuit may be adapted to reduce the response of the controller by disabling the current controller so that the output of the controller is not responsive to the error signal when the certain operating condition is met. When not responsive the current controller may maintain at an output the values that were provided before the noise reduction circuit disable the controller. The controller will no longer track changes in the error signal.

Alternatively, the noise reduction circuit may include an attenuator and may be adapted to reduce the sensitivity of the controller to changes in the error signal by attenuating the error signal that is fed to the controller when the certain condition is met. When the error signal is attenuated the magnitude of the noise is reduced, so the reaction of the current controller to the noise is likewise reduced. The current controller will then respond to the attenuated error signal rather than the original, unmodified, signal.

In a further alternative, the noise reduction circuit may include a filter and may be adapted to reduce the sensitivity of the controller to changes in the error signal by passing the error signal through a filter. This may comprise a low pass filter. The current controller will then respond to the filtered error signal rather than the original, unfiltered, error signal.

The noise reduction circuit may include both an attenuator and a filter, the error signal being passed through the filter and attenuated.

Where the noise reduction circuit comprises an attenuator it may be adapted to attenuate the error signal with a fixed gain or a variable gain.

Where a variable gain is applied the gain may be function of magnitude of error signal, the magnitude of the attenuation being higher for a first error magnitude and lower for a second, higher, error magnitude. The attenuation may be varied continuously over a range of error values around zero error and up to a predefined maximum error above which no attenuation is provided.

The noise reduction circuit may attenuate the error signal by multiplying the error signal by a gain term, or dividing it by an attenuation term, to provide a modified error signal that the current controller reacts to.

The noise reduction circuit may determine that the certain operating condition is met in the event that the motor velocity is below a threshold motor velocity.

The noise reduction circuit may, instead of using an absolute threshold, apply hysteresis to a signal indicative of motor velocity and compare the signal with hysteresis to the threshold to determine if the condition is met. The use of hysteresis may advantageously stop the noise reduction being switches on and off too rapidly.

The noise reduction circuit may also determine that the condition is met if a speed of a vehicle to which the steering is fitted is below a threshold level. It may determine that the condition is met by using a measure of vehicle speed rather than motor velocity, or by using a combination of the two measures.

The current controller may receive a current error signal that is expressed in the d-q axis frame, and the sensitivity of the current controller to the error signal may be in respect of the q-axis component only, or the d-axis component, or both.

The apparatus may be adapted to determine that the motor is rotating slowly or is stationary by measuring or estimating the speed of the motor. It may therefore include means for receiving a signal indicative of the speed of the motor.

According to a second aspect the invention provides a method of controlling an electric motor using a current controller of the kind that generates voltage demand signals to be passed to a drive circuit for the motor that in turn generates pulse width modulated switching signals for a switching circuit that cause the switches to selectively connect the phases of a motor to a power supply so as to cause current to flow through the phases of the motor, in which the current controller is responsive to an error signal that represents the difference between a current demand signal and an actual current signal, the method comprising the steps of identifying an operating condition of the system in which the motor is stationary or rotating at a very low speed, and in the event that the operating condition is identified reducing the response of the controller to variations in the error signal.

The method may comprise reducing the response of the controller to variations in the error signal by at least one of the following:

Disabling the current controller;
Attenuating the error signal and causing the current controller to respond to the attenuated error signal; and
Filtering the error signal.

The method may comprise attenuating the error signal by a fixed or a variable amount.

The method may comprise attenuating the error signal by a variable amount as a function of the magnitude of the error signal. The error signal may be attenuated by a higher amount as the magnitude of the error signal becomes closer to zero.

The variable amount may be varied between a discrete number of levels, for example two or three levels, or may be continuously varied. It may, for example, vary linearly as a function of error magnitude.

According to a third aspect the invention provides an electric power assisted steering system comprising a steering mechanism that connects a steering wheel to a road wheel, a torque sensor that produces a torque signal indicative of the torque carried by a part of the steering mechanism, an electric motor that is connected to the steering mechanism so that torque produced by the motor is transferred to the steering mechanism, a means for generating a torque demand signal indicative of a torque to be applied to the steering system by the motor that is a function of the torque measured by the torque sensor, and a motor control circuit that is responsive to a signal dependent on the torque demand signal, the motor control circuit being arranged in accordance with the first aspect of the invention.

The motor may comprise a three phase brushless DC motor.

Other advantages of this invention will become apparent to those skilled in the art from the following detailed description of the preferred embodiments, when read in light of the accompanying drawings.

DETAILED DESCRIPTION OF THE INVENTION

Figure 10:
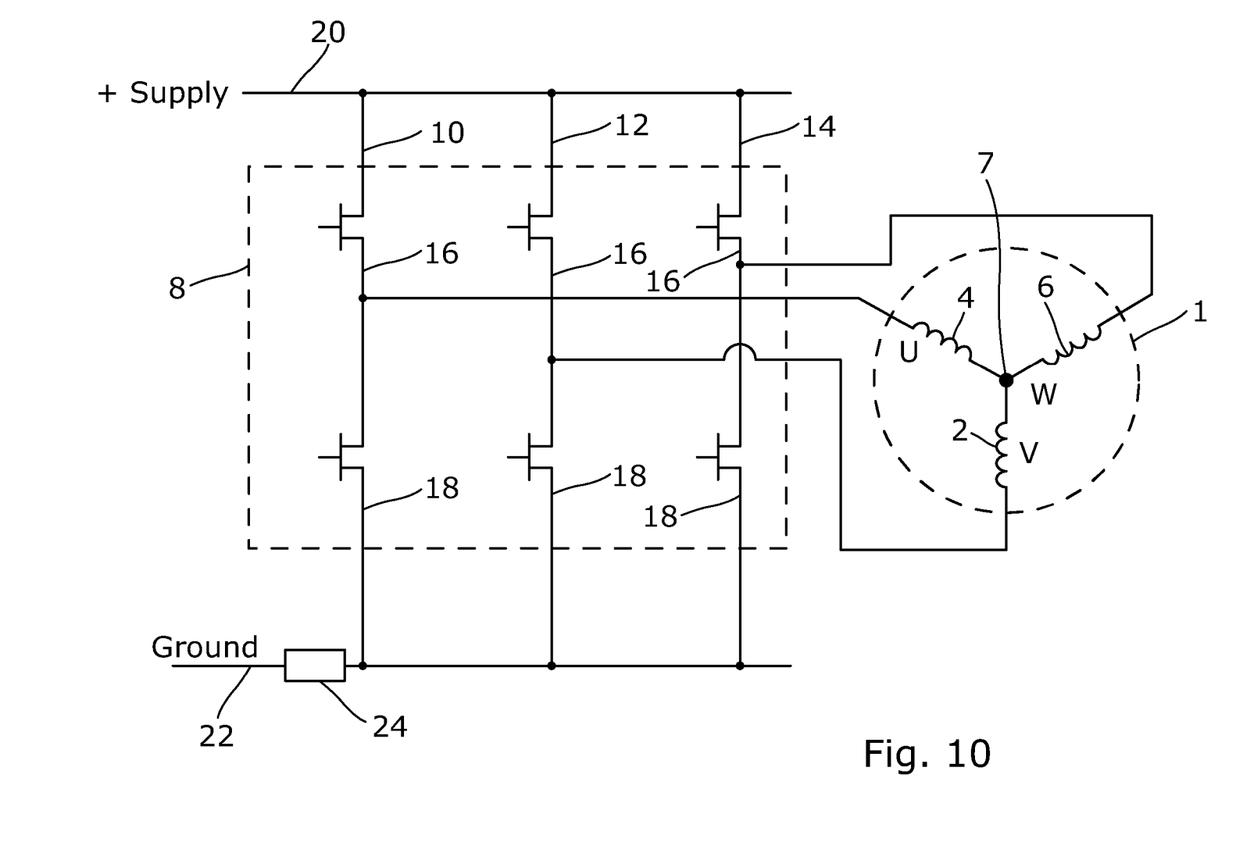
FIG. 10 shows a motor electrical circuit and switching circuit for a three phase DC brushless permanent magnet motor.

Referring to FIG. 10 a three phase brushless motor 1 comprises three motor windings 2, 4, 6, generally designated as phases A, B and C. The phases are connected in a star network but could be connected in another arrangement, such as a delta topology. One end of each coil is connected to a respective terminal. The other ends of the coils are connected together to form the star centre 7. The free ends are connected to a switching circuit arranged as an H-bridge.

The switching circuit comprises a three phase bridge 8, one for each phase of the motor. Each arm 10, 12, 14 of the bridge comprises a pair of switches in the form of a top transistor 16 and a bottom transistor 18 connected in series between a supply rail 20 and ground line 22. The motor windings 2, 4, 6 are each tapped off from between a respective complementary pair of transistors 16, 18.

Figure 3:
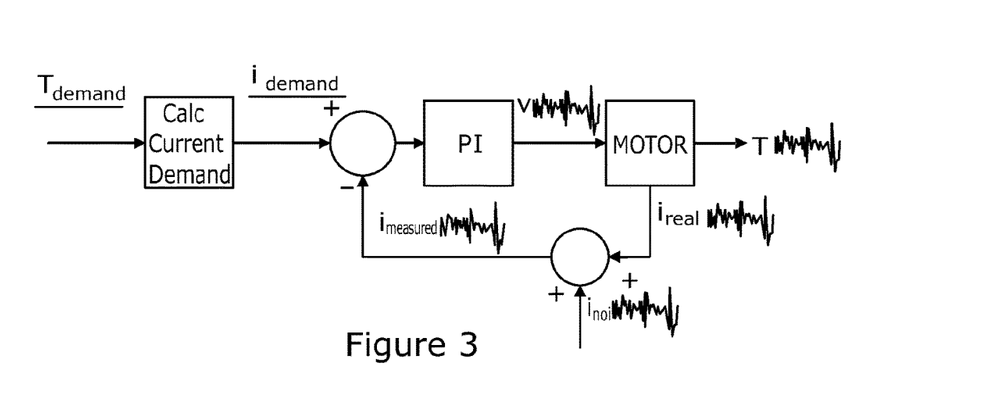
FIG. 3 is an illustration of the effect of the same noise in a closed loop control mode of the current controller.
Figure 4:
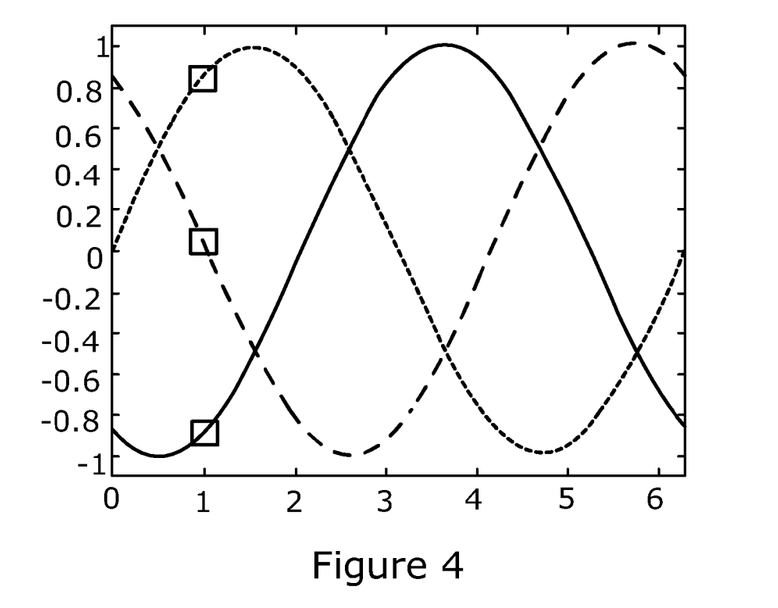
FIG. 4 is an illustration showing the current measurement values obtained when the current in a three phase motor is varying sinusoidally.

The transistors 16, 18 are turned on and off in a controlled manner by a motor controller 21, which is shown in detail in FIG. 3 of the drawings, to provide pulse width modulation of the potential applied to each of the phase windings, thereby to control the potential difference applied across each of the windings 2, 4, 6 and hence also the current flowing through the windings. This in turn controls the strength and orientation of the magnetic field produced by the windings, which sets the torque produced by the motor.

A current measuring device in the form of a resistor 24 is provided in the ground line 22 between the motor 1 and ground so that the controller 21 can measure the total current flowing through all of the windings 2, 4, 6. In order to measure the current in each of the windings the total current has to be sampled at precise instances within the PWM period where the voltage applied to each terminal of the winding (and hence the conduction state of a particular phase) is known. If preferred a separate current sensor could be provided for each phase.

The controller in this example uses a Space Vector Modulation (SVM) algorithm although any modulation technique can equally be used within the scope of the present invention and this should not be construed as limiting.

Each winding 2, 4, 6 in a three phase system can only be connected to either the supply rail 20 or the ground line 22 and there are therefore eight possible states of the switches of the control circuit. Using 1 to represent one of the phases being at positive voltage and 0 to represent a phase connected to ground, state 1 can be represented as [100] indicating phase A at 1, phase B at 0 and phase C at 0, State 2 is represented as [110], state 3 as [010], state 4 as [011], state 5 as [001], state 6 as [101], state 0 as [000] and state 7 as [111]. Each of states 1 to 6 is a conducting state in which current flows through all of the windings 2, 4, 6, flowing in one direction through one of them and in the other direction through the other two. State 0 is a zero volt state in which all of the windings are connected to ground and state 7 is a zero volt state in which all the windings are connected to the supply rail.

During normal operation when the switching circuit is being controlled by the controller 21 to produce pulse width modulation, each of the phases 2, 4, 6 will normally be turned on and off once in each PWM period. The relative lengths of time that are taken up in each state will determine the magnitude and direction of the magnetic field produced in each winding, and hence the magnitude and direction of the total torque applied to the rotor.

Figure 1:
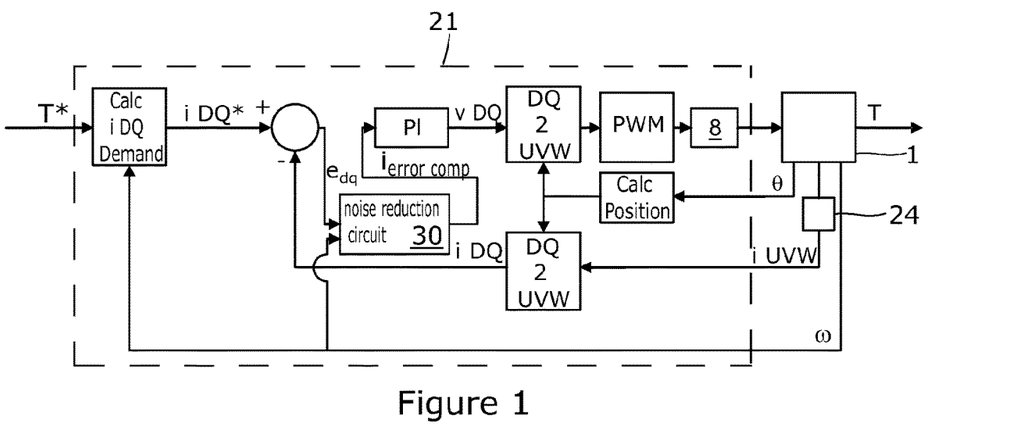
FIG. 1 is a block diagram showing a part of an embodiment of a motor control circuit of the present invention.
Figure 11:
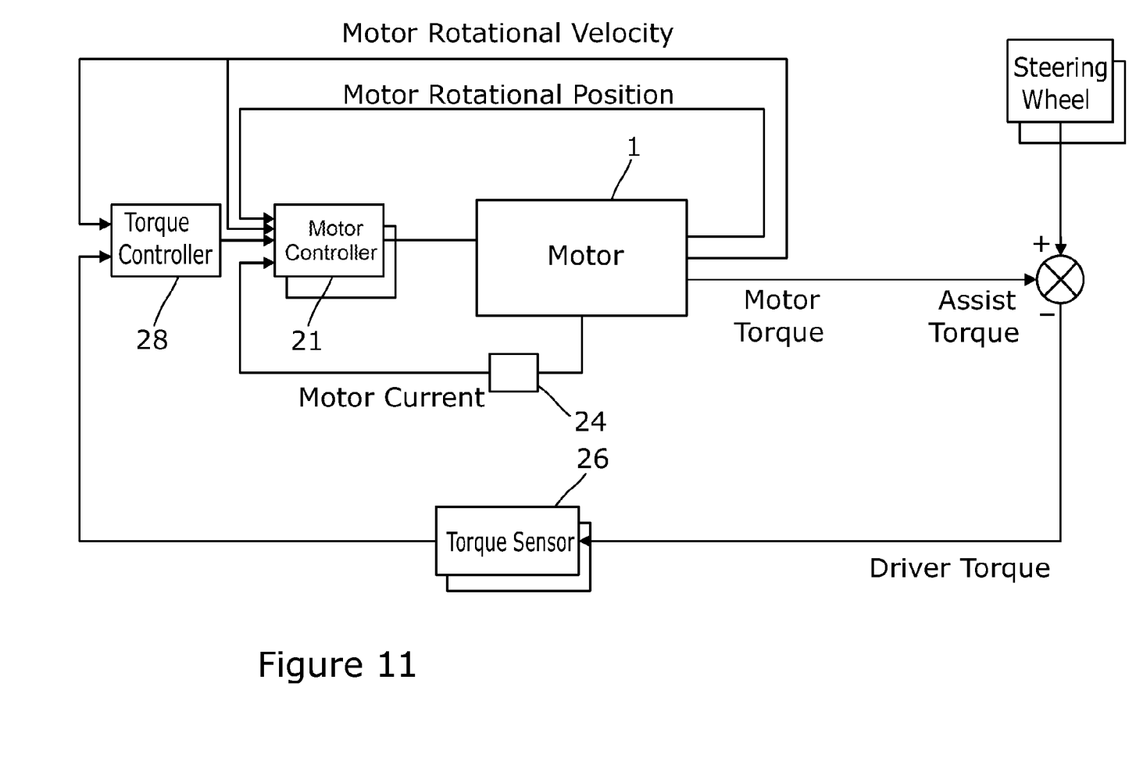
FIG. 11 is an overview of a complete electric power assisted steering system with a motor and motor control circuit in accordance with the present invention.

The motor control circuit of FIG. 1 and FIG. 11 can be used in many applications, and in this embodiment forms part of an electric power steering system. The steering system includes a torque sensor 26 that measures the torque in a steering column, and feeds this to a torque controller. The torque controller calculates a torque demand signal that is indicative of the torque that is to be produced by the motor. This is fed through into the current controller, which converts the torque demand into a current demand according to known characteristics of the motor. The controller then causes the motor to operate and provide the demanded torque. This torque is applied by the motor to the steering system, making it easier for a driver to turn the steering wheel. The system therefore has two closed loops—the torque controller loop and the current controller loop.

The motor control circuit takes the demanded torque and a measure of the motor rotor position w and generates a current demand signal in the fixed d-q frame. This signal is then fed into a subtractor 32 of the current controller along with a measure of the actual current flowing in the motor, expressed in the d-q frame and derived from the output of the current sensor 24. The output of the subtractor is an error signal indicative of the difference between the demanded d-q current and the actual measured d-q current.

The error signal is then passed through a noise reduction circuit 30 and fed to the input of a proportional-integral (PI) controller stage 34 that converts the current error signal which is in the d-q frame into a voltage signal in the d-q frame, and this is then converted into three phase voltages UVW by a dq-UVW converter 36. This is then converted into the required PWM voltage signals for each phase using the chosen SVM modulation technique by a PWM converter 38. The controller constantly attempts to drive the error signal to zero, which ensures that the current in the motor phases matches the demanded current.

The current controller within the EPS system requires a high bandwidth to achieve the desired steering performance. With a high bandwidth controller any noise that falls within the bandwidth of the controller will be reacted to—the controller does not know the difference between the true signal and the measurement noise.

There are multiple sources of noise and for the current controller there are two main sources:

1. Demand signal
2. Feedback signal

The reaction of the controller to this noise is to attempt to cancel it out (in the feedback) or track it (in the demand) with the result that the control action applied to the motor contains the noise component. This injected noise can cause unwanted NVH effects, either through haptic or acoustic effects.

Figure 2:
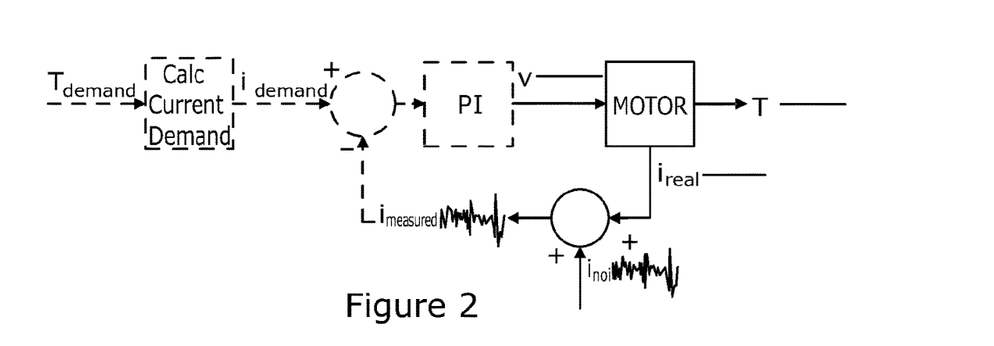
FIG. 2 is an illustration of the effect of noise in the current feedback signal in an open loop control mode.

FIG. 2 shows an open loop system where the controller is disabled and a constant voltage is applied to the motor. The current has no noise and is measured by the ECU; the measurement signal has noise added to it. Closing the loop and enabling the controller (FIG. 3); the controller sees the measurement noise which appears an error between the demand and the measured signal. The controller, attempting to remove the noise, applies voltage demands to the motor containing this noise with result that noise is present in the real current.

Typically this noise is only heard when the motor is stationary or rotating slowly, where the phase currents are almost constant, and will manifest as a rumble noise. When the motor is rotating the phase currents are sinusoidal and therefore the noise disappears as the currents are varying.

Figure 5:
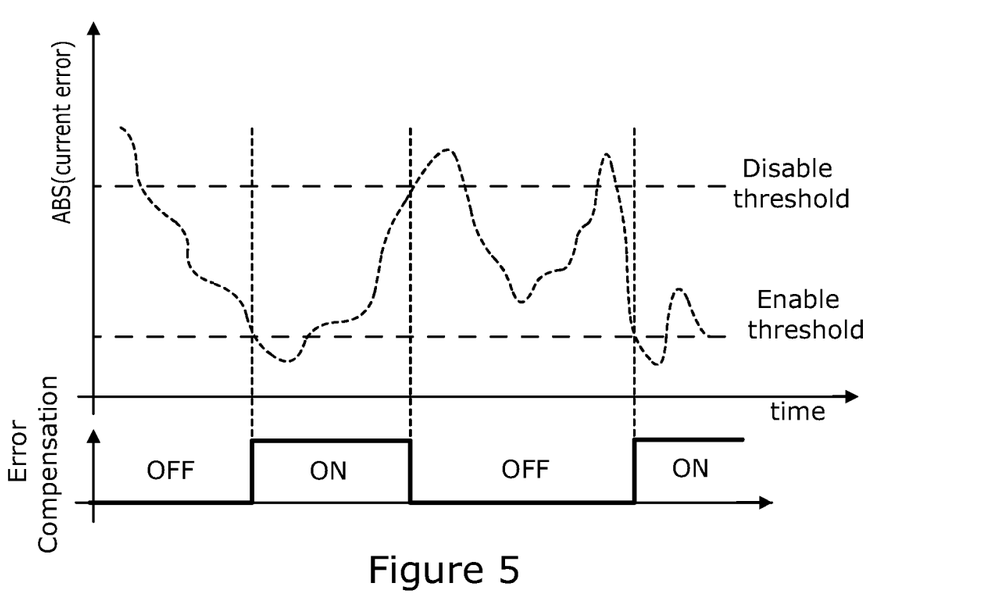
FIG. 5 shows a representative variation in current error signal value over time alongside a plot showing the noise reduction circuit switching noise reduction on and off over the same timescale as the magnitude of the error signal value crosses a threshold, hysteresis being applied.

FIG. 5 shows typical sinusoidal currents over one electrical revolution. As the motor rotates the currents change; when the motor is stationary the currents are static, an example high lighted at 1 rad. Rotating the noise and quantisation levels of the current measurements are hidden as the currents sweep through the various levels. Stationary the small changes in ADC quantisation can be detected, small changes in current translate into small changes in torque which the driver is sensitive to.

The applicant has appreciated that one of the main contributors to the noise in the feedback current is the resolution of the current measurement. Typically for an electric power assisted steering (EPS) application higher power motors are required which require large current levels. As the current range increases the resolution of the measurement is degraded, e.g. with a 10 bit ADC the measurement is quantised to 1024 levels. For an EPS system which can measure current up to ±150 A this means that the resolution is about 0.3 A. When the motor is stationary and the phase currents are constant this quantisation is an issue and the controller jumps between the levels, e.g. for a 10 A demand the measured current will be 9.7 A, 10 A and 10.3 A. It is these steps changes that the control reacts to.

In this embodiment, a noise reduction circuit is provided that is only activated under specific circumstances when it is known that rumble can be present. At all other times, for full dynamic steering performance the noise reduction circuit is disabled. The algorithm only operates when particular conditions are fulfilled, signified by rumble conditions met, although this is not directly relevant to the patent application. The conditions are:

Vehicle speed is below a threshold specified by rumble vehicle speed enable.

Motor speed is below a threshold specified by rumble motor speed enable.

Hysteresis is optionally applied to both of these signals. An example implementation could be:

```
IF (ABS(motor mechanical velocity) >= (RUMBLE MOTOR SPEED
ENABLE + RUMBLE MOTOR SPEED HYSTERESIS)) OR
(vehicle speed >= (RUMBLE MOTOR SPEED ENABLE + RUMBLEX
MOTOR SPEED HYSTERESIS))
    rumble conditions met = FALSE
ELSE
    IF (ABS(motor mechanical velocity) < RUMBLE MOTOR SPEED
ENABLE) AND
                    (vehicle speed < RUMBLE VEHICLE
                        SPEED ENABLE)
        rumble conditions met = TRUE
    ENDIF
ENDIF
```

The noise reduction circuit operates on the controller error (e DQ in FIG. 1), the signal that drives the current controller rather than the separate demand and actual feedback current signals.

$d$ axis current error=$d$ axis current demand−$d$ axis current $q$ axis current error=$q$ axis current demand−$q$ axis current The rumble issue only occurs when the motor is stationary or rotating very slowly, which for the current controller is almost a steady state condition. This is used to activate the rumble compensation, i.e. when the error is almost zero then compensation can be activated, otherwise the control must react with full bandwidth to remove the error. Hysteresis can be applied to the enable threshold to minimise cycling in and out of the condition as shown in FIG. 5.

The compensation can be activated as:

```
IF ( (ABS(q axis current error) >= rumble motor control current disable)
OR
                        (rumble conditions met == FALSE) )
        rumble motor control current active = FALSE
ELSE
    IF ( (abs_q_axis_error < RUMBLE MOTOR CONTROL
CURRENT ENABLE) AND
                        (rumble conditions met == TRUE) AND
                        (rumble motor control current active ==
                            FALSE) )
        rumble motor control current active = TRUE
    ENDIF
ENDIF
```

When rumble motor control current active is TRUE there are a number of possible options:
1. Disable the current controller
2. Attenuate the error signal by a fixed gain
3. Attenuate the error signal by a variable gain
4. Filter the error signal A combination of the above may be suitable, depending on the application, e.g. the filtered error signal may be used to drive the variable gain approach, e.g. as shown in 6 and FIG. 7 (active in FIG. 6 and inactive in FIG. 7).

Figure 6:
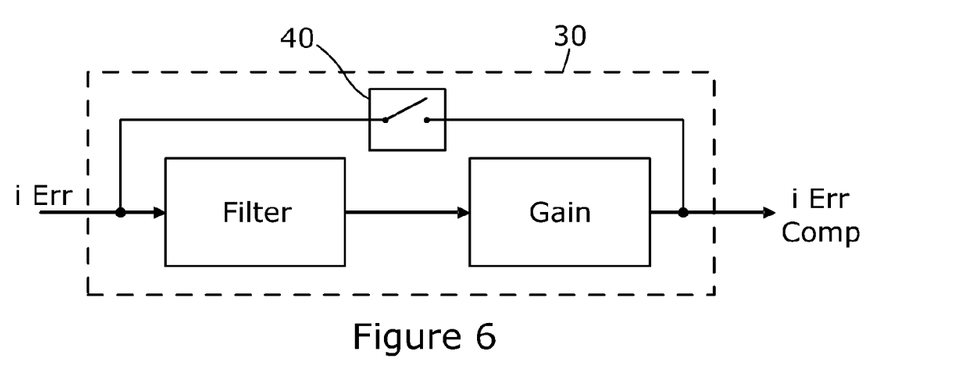
FIG. 6 is block diagram of a suitable structure of the noise reduction circuit 30 when switched on and attenuating the error signal.
Figure 7:
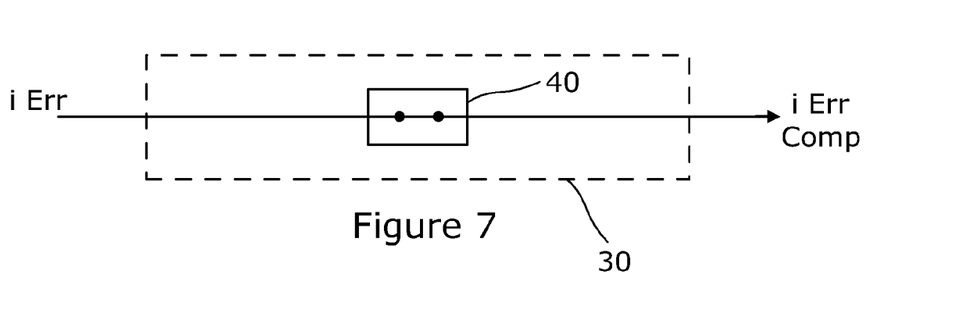
FIG. 7 is a corresponding block diagram showing the same noise reduction circuit 40 when switched off and applying no attenuation.

The benefit of the provision of the novel noise reduction circuit within the current controller is that the compensation only becomes active when the current controller has reached the target demanded therefore the full bandwidth is present for dynamic situations. As shown a bypass switch 40 is opened and closed to activate and deactivate the noise reduction circuit.

One option is to disable the current controller when rumble current control active is TRUE. By disabling the current controller the last voltage output by the controller is held, maintaining the set point until the absolute error exceeds rumble motor control current disable. Although this is the ultimate solution (the controller is frozen so no signal is propagated) in practice this can have an adverse effect on the steer-feel although for some applications where steer-feel is not an issue this may be an option.

Figure 8:
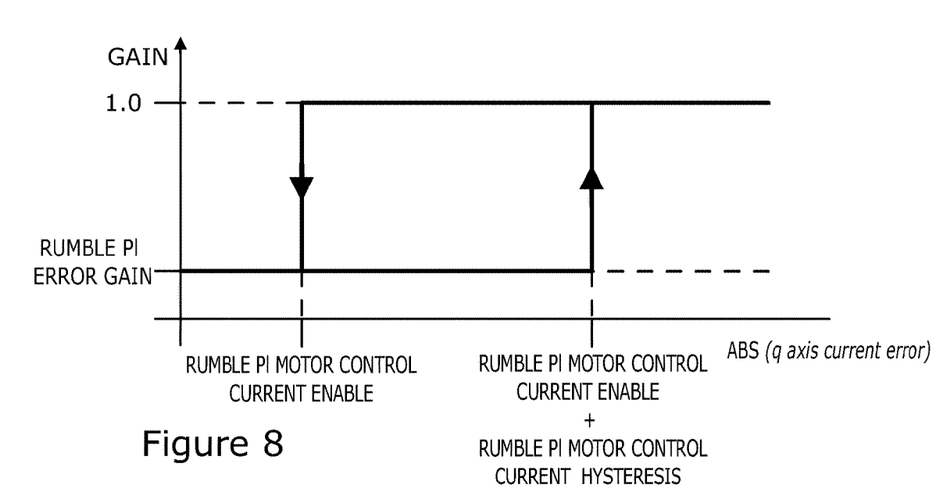
FIG. 8 is a plot of absolute current error against gain for the noise reduction circuit with use of hysteresis.

Another option is attenuate the error signal, i.e. when rumble motor control current active is TRUE reduce the error terms (D and Q) by RUMBLE PI ERROR GAIN which is a value between 0 and 1.0. A RUMBLE PI ERROR GAIN of 0 means that the error term is zero, effectively freezing the current controller. A RUMBLE PI ERROR GAIN of 1.0 has no effect and the PI controller operates as normal. Selection of a value in between reduces the error term and reduces the response of the controller with a subsequent reduction in rumble as shown in FIG. 8.

$d$ axis current error=$d$ axis current error×RUMBLE PI ERROR GAIN $q$ axis current error=$q$ axis current error×RUMBLE PI ERROR GAIN Note that a RUMBLE PI ERROR GAIN of zero is the same as disabling the current controller.

Figure 9:
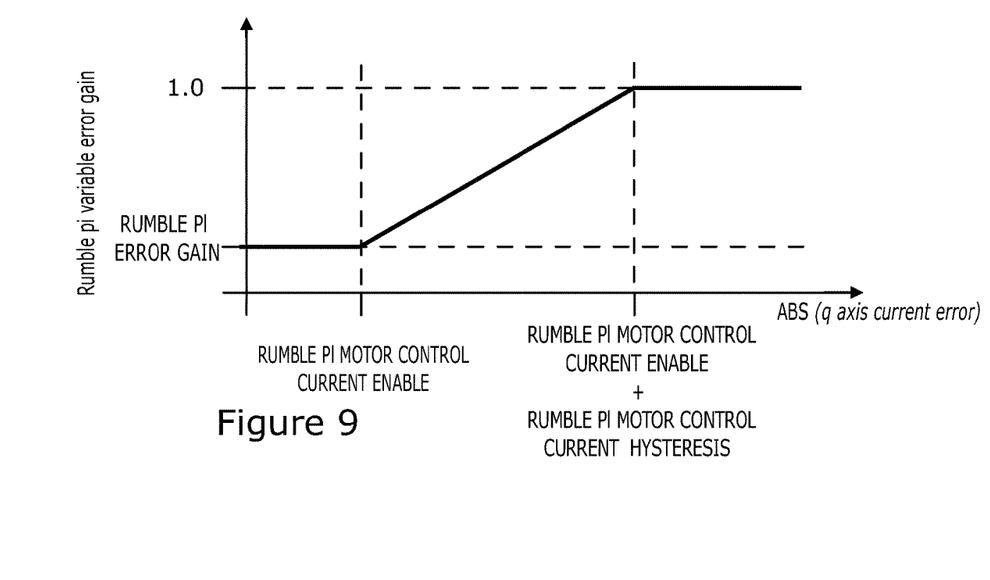
FIG. 9 is a plot of absolute current error signal value against gain for the noise reduction circuit.

Another option within the scope of the present invention is to vary the level of attenuation depending on the level of error. As the error term approaches zero it is attenuated more strongly as illustrated in FIG. 9 which is a plot of error magnitude against error gain.

Another option is to filter the error signal, initialising the filter at activation with the last unfiltered measurement to provide a smoother transition into the filtered case. Unlike with the original strategy the filter is only active when the target current has been met therefore the destabilising effect of the filter lag is not an issue.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

The invention claimed is:

1. A motor control circuit for an electric motor of an electric power assisted steering system of the kind in which a measurement of torque carried by a part of the steering system is used to produce a torque demand signal indicative of a torque to be applied to the steering system by the motor, the motor control circuit comprising:
   a switching circuit comprising a plurality of electrical switches;
   a current controller that generates voltage demand signals to be passed to a drive circuit for the switches that in turn generates pulse width modulated switching signals for the switching circuit that cause the switches to selectively connect the phases to a power supply so as to cause current to flow through the phases of the motor;
   a subtractor generating an error signal that represents the difference between a current demand signal and an actual current signal; and
   a noise reduction circuit passing the error signal from the subtractor and adapted to attenuate the error signal during an operating condition of the steering system in which the motor is stationary or rotating at below a rumble speed threshold to reduce a response of the current controller to variations in the error signal when the operating condition is met, wherein the noise reduction circuit includes a bypass to pass the error signal unattenuated to the current controller when the operating condition is not met.

2. The motor control circuit according to claim 1 in which the noise reduction circuit receives a signal indicative of a velocity of the motor and is adapted to determine that the operating condition is met in the event that the motor velocity is below a threshold motor velocity.

3. The motor control circuit according to claim 2 in which the noise reduction circuit applies hysteresis to a signal indicative of motor velocity and compares the signal with hysteresis applied to the threshold motor velocity to determine if the operating condition is met.

4. The motor control circuit according to claim 1 in which the noise reduction circuit is adapted to receive a signal indicative of a speed of a vehicle to which the steering system is fitted, and in which the noise reduction circuit determines that the operating condition is met if the speed of the vehicle is below a threshold level.

5. The motor control circuit according to claim 1 in which the current controller receives a current error signal that is expressed in the d-q axis frame, and a sensitivity of the current controller to the error signal is in respect of a q-axis component only, or a d-axis component, or both.

6. A method of controlling an electric motor using a current controller of the kind that generates voltage demand signals to be passed to a drive circuit for the motor that in turn generates pulse width modulated switching signals for a switching circuit that cause the switches to selectively connect the phases of a motor to a power supply so as to cause current to flow through the phases of the motor, in which the current controller is responsive to an error signal that represents a difference between a current demand signal and an actual current signal, the method comprising the steps of;
   passing the error signal through a noise reduction circuit;
   identifying an operating condition in which the motor is stationary or rotating at a speed below a rumble threshold; and
   attenuating the error signal in the noise reduction circuit when the operating condition is identified in order to reduce a response of the current controller to variations in the error signal so that the voltage demand signals are not responsive to the error signal when the operating condition is met and otherwise bypassing the error signal through the noise reduction circuit without attenuation to the current controller when the operating condition is not met.

\* \* \* \* \*